Oct. 31, 1967  H. HOPFELD  3,349,537
REINFORCED STRUCTURAL MEMBER
Filed Aug. 12, 1965  2 Sheets-Sheet 1

INVENTOR
HENRY HOPFELD
BY George B White
ATTORNEY

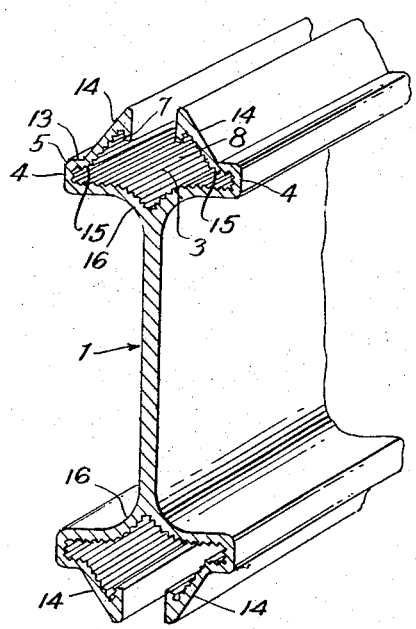
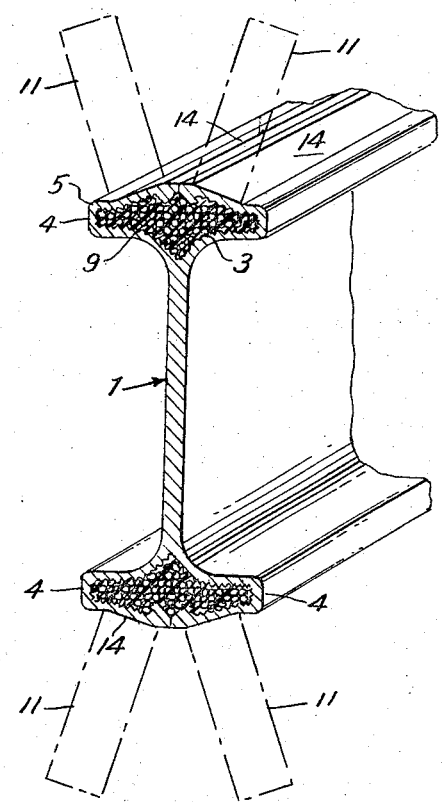
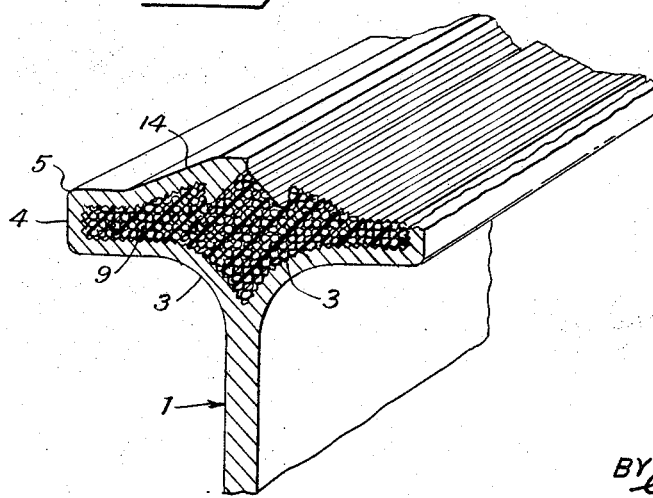
INVENTOR
HENRY HOPFELD
BY George B. White
ATTORNEY

United States Patent Office 3,349,537
Patented Oct. 31, 1967

3,349,537
REINFORCED STRUCTURAL MEMBER
Henry Hopfeld, 51 Winship Ave., Ross, Calif. 94957
Filed Aug. 12, 1965, Ser. No. 479,120
5 Claims. (Cl. 52—729)

ABSTRACT OF THE DISCLOSURE

A longitudinal recess formed on a longitudinal flange of a structural member by a bottom, spaced longitudinal side walls along the edges of said bottom, and cover walls folded over from the free edges of said side walls to cover said recess and compact longitudinally oriented glass fiber strands integrated in the recess by a binder; a hook flange on the longitudinal edge of each cover wall projects into said compacted glass fiber strands; the hook flanges contacting one another and slanting away from one another inwardly of the recess.

---

A structural member, for instance an I beam, has on at least one of its flanges a longitudinal recess or pocket filled with a filler of stranded reinforcing material such as longitudinally oriented glass fiber integrated by a binder; cover walls of said recess are folded over the recess and toward one another so as to compact said filler, and hook flanges on said cover walls project into said filler to further integrate and stiffen said filler.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is a perspective view of modified form of flange on the I beam open.

FIG. 5 shows the modified flange structure closed.

FIG. 6 is a perspective fragmental view on an enlarged scale showing a modified flange partly broken away and exposing the reinforcing glass fibers.

Generally the method of reinforcing structural members includes the steps of forming one or more recesses of the structural member, filling the longitudinal recess with glass fiber such as so-called fiber glass roving, longitudinally oriented in the recess, providing a binder for the glass fiber, then compacting the longitudinally oriented glass fiber and binder by closing the initially open recess upon and around the filler, and finally treating the filler so as to set the same, for instance by subjecting it to heat.

In the specific form herein illustrated on an I beam, such as the side rails or bars of an aluminum ladder, the method includes the steps of forming the flanges of the I beam with hollow longitudinal recesses, corrugating the inner surfaces of the recesses longitudinally, filling the recesses with so-called fiber glass roving oriented longitudinally in the recesses so that the fiber glass strands are parallel with the longitudinal axis of the beam, providing binder for the fiber glass roving in the recess, closing the recess on said filler so as to compact the filler in the recess, then treating the filler for setting and integrating the filler with the respective materials of the recess, for instance by subjecting the flanges to heat and pressure.

Figure 1:
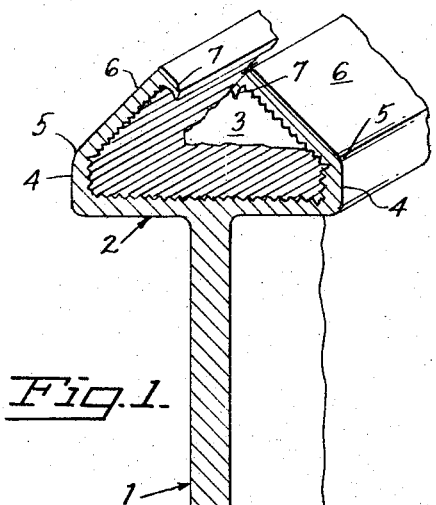
FIG. 1 is a perspective view of the I beam showing the flanges in open position.

In the form shown in FIG. 1, the structural member is an I beam utilized for ladders or similar use where flexural strength is required with minimum side sway, and where lightness is also desirable.

Figure 2:
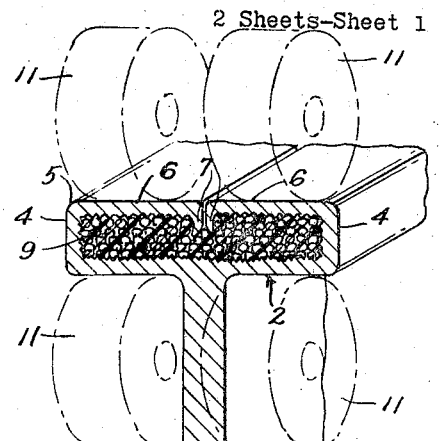
FIG. 2 is a perspective view of the I beam showing the flanges in closed position.
Figure 3:
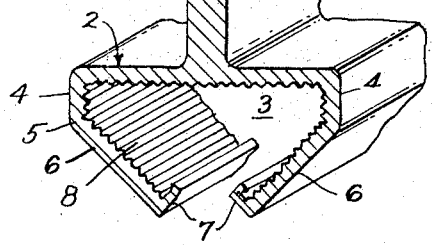
FIG. 3 is an enlarged fragmental perspective view with the flange partly broken away, exposing a glass fiber reinforcement.

The I beam 1, shown in FIGS. 1 to 3, has a longitudinal hollow flange 2 along each edge thereof. The flanges 2 extend to opposite sides of the I beam 1. Each flange 2 is hollow so as to form an initially open longitudinal recess 3. The recess 3 is formed by opposite side walls 4 extended perpendicularly from each edge of the flange 2 away from and parallel with the beam 1. From the outer edge 5 of each side wall 4 extends a cover plate or flap 6 foldable around the edge 5 inwardly. Each cover plate or flap 6 covers about a longitudinal half of the recess 3. On the free edge of each cover plate 6 is provided a longitudinal hook flange 7 which projects inwardly of the recess 3 when the cover plates 6 are folded together.

The inner faces of the flanges 2, the side walls 4, and the cover plates or flaps 6 have longitudinal corrugations or serrations 8 thereon. In the initial position the cover plates 6 extend away from the adjacent flange 2 so as to leave a longitudinal access opening into the recess 3.

Glass fibers such as fiber glass roving 9 are laid into the recess 3 as shown in FIG. 2. This roving 9 is coated with a suitable binder or if needed, suitable binder is packed in with the roving 9 tightly so as to fill the recess 3 and bulge over under the open cover plates 6. When the cover plates 6 are folded together from the position shown in FIG. 1 into the positions shown in FIGS. 2 and 3, fiber glass roving filler is compacted.

As shown in FIG. 2, the cover plates 6 are folded into the recess 3 by suitable rollers 11, engaging simultaneously the cover plates 6 on both flanges of the I beam 1. As the I beam 1 is passed between the rollers 11 and after the cover plates 6 are folded tightly, heat is applied to the flanges and the cover plates 6 for setting the binder and the fiber glass so as to integrate the filler with the serrated walls of the recess 3.

The form shown in FIG. 4 and FIG. 6 differs from the first described form by providing a shoulder 13 on the top of each side wall 4, and each cover plate 14 is somewhat larger than the distance between the inner edge 15 of the shoulder 13 and the center plane of the I beam so that when the cover plates 14 are folded about the edges 15, they remain in an inclined position bulging outwardly as shown in FIG. 5 and FIG. 6. In this form also the base flange 16 is formed on a radius on each side of the I beam thereby to increase the space for the filler.

Figure 7:
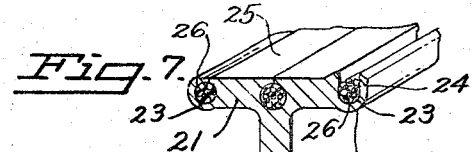
FIG. 7 is a perspective view of the I beam with spaced longitudinal recesses in its flanges for enclosing the glass fiber reinforcement.

In the form shown in FIG. 7 each flange 21 of the I beam 22 has a plurality of parallel recesses 23 therein. The sides of the recesses have cover projections 24 extended beyond the outside faces 25 of the respective flanges 21. Then fiber glass roving 26 is laid into the recesses 23 together with suitable binder. Then the cover projections 24 are folded over the filler by rollers or the like so as to compact and cover the fiber glass roving 26. Then by submitting the flanges to heat treatment while the filler is under compression, the longitudinally oriented glass fiber filler is integrated with the respective flanges.

The product of the method is an I beam which has flexural strength much greater than the metal with which they are integrated. For instance, in aluminum ladders the flexural strength of the ladder is increased greatly and side-sway is materially reduced, yet the weight of the ladder is not materially increased.

The integration of this filler with the metal of the flanges results in a pre-stressing of the longitudinal flanges. This pre-stressing is accomplished by rolling down the cover plates or flaps 6, or 14, or the cover projections 24, progressively step by step along the length of the flanges of the structural member thereby gradually and progressively compressing the strands of fiber glass into the recess and simultaneously curing the finder such as polyester or the like. The relative shrinkage produced by this step will result in the longitudinal pre-stressing of the flanges of the structure member.

The longitudinal hook flanges 7 by their inter-engagement with the integrated fiber glass roving, after such curing and setting, as hereintofore described, extend deeply enough into the filler to prevent the pulling out of the flaps when the structural member is subjected to compressive forces. The aforedescribed method also materially increases the tensile strength of the structural member.

I claim:
1. A structural member comprising
   (a) a metal body,
   (b) a longitudinal flange along one edge of said body,
   (c) walls of said flange defining a longitudinal recess in said flange,
   (d) the wall of said flange adjacent said edge of said body being the bottom wall of said recess,
   (e) side walls extended from said bottom wall,
   (f) a cover wall folded inwardly from at least one of said side walls to form the top of said recess,
   (g) stranded reinforcing filler longitudinally oriented in said recess and compacted by the folding of said cover wall over said recess,
   (h) a longitudinal hook flange along the free edge of said cover wall projecting into said recess and into the compacted stranded filler.
2. The structural member defined in claim 1, wherein said stranded reinforcing filler being longitudinally extended glass fibers compacted by said cover wall and integrated by a binder.
3. The structural member defined in claim 1, and
   (i) said side walls being spaced from one another and extending longitudinally on said flange,
   (j) one cover wall extending from each side wall toward the other side wall, and there being one of said hook flanges along the free edge of each cover wall, said hook flanges contacting each other and slanting away from one another inwardly.
4. The invention defined in claim 2, and the inside faces of said walls of said recess being longitudinally serrated.
5. The structural member defined in claim 3, and
   (k) each of said cover walls being wider than half of the width of said flange so as to incline away from said bottom wall when said cover walls are pressed in contact with one another.

References Cited
UNITED STATES PATENTS

| | | | |
|---|---|---|---|
| 2,862,650 | 12/1958 | Scott et al. | 182—219 X |
| 2,875,312 | 2/1959 | Norton. | |
| 2,887,762 | 5/1959 | Dobell | 29—155 |
| 2,966,229 | 12/1960 | Frezieres | 182—46 X |
| 2,969,618 | 1/1961 | Ratner et al. | 52—309 X |
| 3,039,232 | 6/1962 | Dunn | 52—309 X |
| 3,088,561 | 5/1963 | Ruzicka | 52—729 X |
| 3,201,862 | 8/1965 | Gotoh | 29—470 X |
| 3,271,917 | 8/1966 | Rubenstein | 52—309 X |

BOBBY R. GAY, *Primary Examiner.*

ANDREW CALVERT, *Assistant Examiner.*